April 20, 1965 N. BRADLEY ETAL 3,179,279

SEALING PLUGS

Filed Feb. 19, 1960

INVENTORS
NORMAN BRADLEY
JACK JONES
BY
ATTORNEY

United States Patent Office 3,179,279
Patented Apr. 20, 1965

3,179,279
SEALING PLUGS
Norman Bradley, Culcheth, Warrington, and Jack Jones, Manchester, England, asisgnors to United Kingdom Atomic Energy Authority, London, England
Filed Feb. 19, 1960, Ser. No. 9,847
Claims priority, application Great Britain, Mar. 11, 1959, 8,380/59
2 Claims. (Cl. 220—24.5)

This invention relates to sealing plugs and has one application to the sealing of stand-pipes providing access to the core of a steam cooled or steam generating nuclear reactor.

A nuclear reactor which is part of a system for generating electricity on a commercial scale is preferably provided with means for refuelling the reactor without shutting down the reactor (generally referred to as "on-load" refuelling). To this end the reactor is provided with a series of stand-pipes giving access to the core of the reactor, the pipes being sealed during normal reactor operation and open to a refuelling machine during a refuelling operation. The sealing arrangements for the stand-pipes have to meet an onerous specification. For example, in a steam cooled or steam generating reactor the sealing arrangements may have to operate at 800 p.s.i. pressure, 260° C. temperature whilst being leak free (as the steam would be activated in its passing through the core) and readily removable, storable and replaceable by remotely operated tools.

According to the invention, a sealing plug comprises a plug body, means defining an annular projection about the periphery thereof, a coaxial sleeve member located by and movable relative to the body, at least one pipe sealing ring of resilient material disposed between the annular projection and the sleeve member, means including a spring component tending to urge the sleeve member and the body member together so as to compress the ring, a weight member heavy enough to overcome the urging effect of the spring component connected to said spring component and depending from the body, and wherein the interior of a pipe is provided with support means for supporting the weight of said weight member to allow said spring component to take effect.

Figure 1:
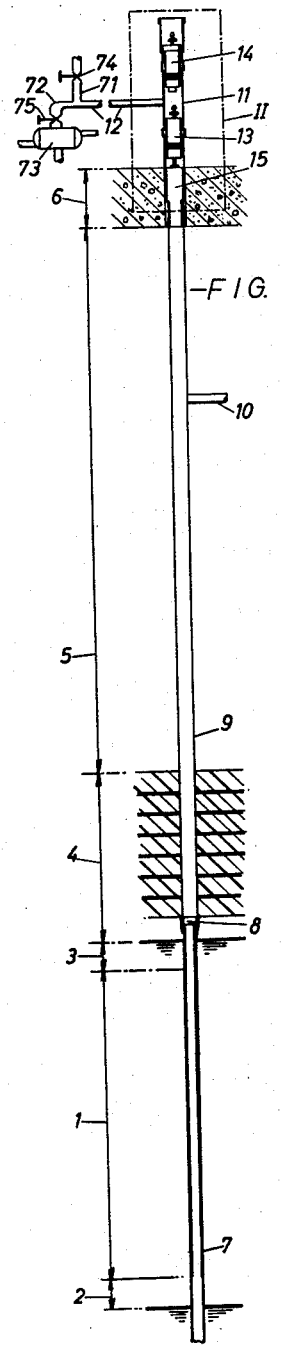
Figure 2:
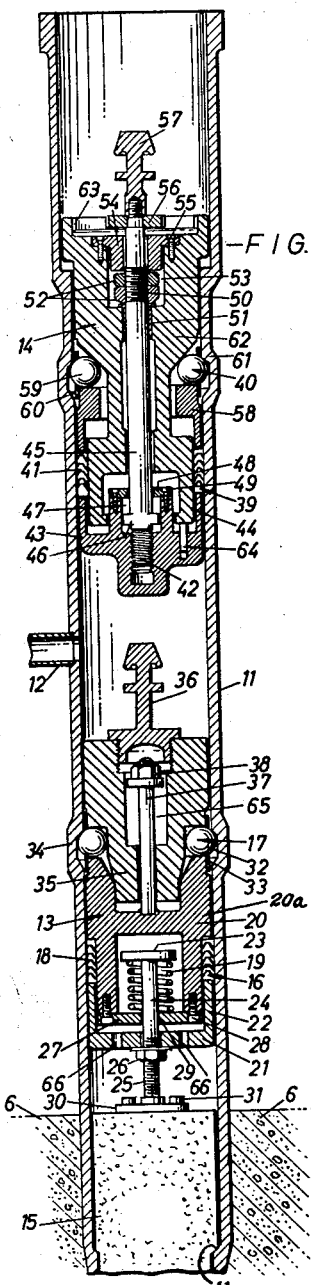

A sealing plug according to the invention will now be described by way of example with reference to the accompanying drawings in which FIG. 1 is a sectional elevation of a stand-pipe associated with a steam-cooled nuclear reactor and FIG. 2 is an enlarged view of the part of FIG. 1 enclosed by the box II.

In FIG. 1 there is shown, partly diagrammatically, a core 1 of a water-moderated steam-cooled nuclear reactor having a bottom reflector 2 and a top reflector 3. Above the reflector 3 there is provided a neutron shield 4 followed, in the upward direction, by a void 5 in which reactor coolant pipes are accommodated. and a gamma shield 6. The components 1–6 referred to above are penetrated by a pipe system which consists (starting at the bottom) of a zirconium pressure tube 7, a joint 8, a steel pipe 9, having a steam inlet connection 10, and, at the top, a stand pipe 11 having a connection 12 with a branch 71 leading to the atmosphere and a branch 72 leading to a condenser 73. The branches 71, 72 have shut-off valves 74, 75 respectively. Under normal operating conditions, valve 75 is open and valve 74 closed. The stand pipe 11 is equipped with two sealing plugs 13, 14; one below and one above the connection 12. The plug 13 carries a gamma shield plug 15 maintaining the integrity of the shield 6.

Sealing plugs 13 and 14 will now be described in detail with reference to FIG. 2. It will be appreciated 14 forms no part of the claimed invention.

The plug 13 has two parts; a sealing part 16 and a latch part 17. The sealing part has a resilient chevron packing made from a number of chevron rings 18 of asbestos impregnated with silicone rubber, the rings being expansible radially to effect a seal by axial loading provided by a spring 19 acting on a plug body 20 having an annular projection 20a about its periphery. The rings 18 are disposed between the projection 20a and a coaxial sleeve part 22 located by and movable relative thereto the plug body 20. The sleeve part 22 which presses on the rings 18, is part of a cap-like component 21 having apertures 66 in its base. The loading of the spring 19 is transmitted to the body 20 by contact at the lower end of the spring with an end plate 27 secured with screws 28 and is transmitted to the component 21 by way of an end-cap 23 connected with a rod 24 having a thread 25 and nut and washer 26. The rod 24 passes through a hole 29 in the plate 27. The thread 25 also connects with a flange 30 secured to the shield plug 15 by bolts 31.

The latch part has a ring of balls 32 supported in a cage 33 and in contact with the member 20. The ring of balls 32 can be expanded radially to latch in a circumferential recess 34 in the stand pipe 11 by a conical-shaped ball displacing member 35. The member 35 is provided with a lifting hook 36 and the body 20 has a lifting bolt 37 terminating in a nut and washer 38 in a cavity 65 in the conical part 35.

In the operation of sealing and latching of the plug 13, the spring 19 creates sufficient pressure at the rings 18 to effect a preliminary seal. Subsequently, when the reactor is pressurised, full reactor pressure (800 p.s.i.) leaking past the shield plug acts on the rings 18 to increase their sealing effect against reaction offered by the body 20. The reactor pressure also acts, through the apertures 66 in the component 21, on the body 20 and the resultant forces are transmitted to the balls 32.

The plug 14 also has two parts; a sealing part 39 and a latch part 40. The sealing part has a chevron packing made from a number of chevron rings 41 radially expansible by axial force applied by a nut and screw 42. (These rings 41 do not have such an arduous duty to perform as corresponding rings 18 in plug 13 and could therefore be of other construction.) The nut is the boss of a ring 43 having a sleeve 44 which presses against the rings 41. The screw is the lower threaded part of a rod 45 having a flange 46 movable in a cavity 47 and limited in its axial movement by a stop plate 48 held by screws 49. The ring 43 is prevented from rotating by a pin 64. Near the upper end of the rod 45 there is a thread 50 and a bush 51. The thread 50 carries a pair of lock-nuts 52 which are located in a cavity 53 closed by a stop-plate 54 secured by screws 55. The upper end of the rod 45 has fixed to it a toothed wheel 56 and the rod 51 is terminated in a lifting hook 57. The compression force provided by the nut and screw to the rings 41 acts against a member 58.

The latch part 40 has a ring of balls 59 supported in a cage 60 and the balls are in contact with the member 58. The ring of balls 59 can be expanded radially to latch in a circumferential recess 61 in the stand pipe 11 under axial loading provided by the member 58 in combination with a conical shaped part 62. The top end of the part 62 is provided with splines 63.

In the operation of sealing and latching of the plug 14 the plug is inserted into the stand-pipe 11 by suspension from the hook 57 with the nut and screw 42 released so that the rings 41 are not compressed and the balls 59 are in their innermost position, the rings 41 and member 58 having lowered themselves with the nut and screw released. The nut and screw are now tightened up (by a tool causing relative rotation between splines 63 and toothed wheel 56) so that rings 41, member 58 and balls 59 are elevated. The balls are driven into tight engagement between the conical shaped part 62 and recess 61 and the rings 41 are compressed to make a seal.

To unplug the stand pipe to allow fuel elements to be inserted and withdrawn a fuel element refuelling machine is joined with the stand-pipe 11 and a remotely operated tool in the refuelling machine is advanced to engage with splines 63 and wheel 56 of plug 14. The pipe 12 is disconnected from its condenser and opened to atmosphere by closing valve 75 and opening valve 74. That part of the tool engaging with wheel 56 is rotated to release the compression of rings 41 and balls 59 and the plug 14 removed by lifting on the hook 57.

The valves 74, 75 (FIG. 1) are now closed and the stand pipe steam-pressurised. On balancing pressure across plug 13 the loading on the chevron rings 18 is reduced to that afforded by the spring 19. Lifting on the hook 36 allows the balls to be released and the conical-shaped member 35 contacts the nut 38. The lift is then applied also to the body 20 via the nut 38 so that the spring compresses under the weight of the plug 15. The component 21 remains stationary with the plug 15 whilst the spring compresses, thus releasing the loading on the rings 18 so that the sealing of the rings 18 is broken. Further lifting then removes the plug 15 so providing access to the fuel elements.

The provision of the two plugs 13, 14 with the connection 12 between them to a condenser ensures that any leakage past plug 13 (which may be contaminated with radioactive material) is removed to the condenser. It also provides an interspace from which the integrity of the sealing of the plug 13 can be examined by flow measurement in the pipe 12 and the provision of two plugs also provides security if the plug 13 should fail to seal. The plug 14, whilst normally subject to atmospheric pressure acting inwards is nevertheless capable of withstanding full reactor pressure of 800 p.s.i. acting outwards. The plug 13 is self sealing when subjected to reactor pressure. This greatly facilitates manipulation. The self sealing is operated by the spring 19 in conjunction with the weight of the shield plug 15. When the plug 13 is being inserted the weight of the shield plug overcomes the tension in the spring 19 so that the chevron packing 18 is loose. When the plug 15 is arrested by a seating 11a in the bore of the stand-pipe 11 the tension in the spring 19 compresses the packing 18 to make an initial seal which is finally made on the application of reactor pressure.

We claim:
1. In the combination of an upright pipe, a plug for sealing the bore of the pipe and pipe-engaging latch members carried by the plug for receiving the plug in the bore of the pipe, the improvement wherein the plug comprises a plug body, means defining an annular projection about the periphery thereof, a coaxial sleeve member located by and movable relative to the body, at least one pipe sealing ring of resilient material disposed between the annular projection and the sleeve member, means including a spring-component tending to urge the sleeve member and the body member together so as to compress the ring, a weight member heavy enough to overcome the urging effect of the spring component, connected to said spring component and depending from the body and wherein the interior of the pipe is provided with support component for supporting the weight of said weight member and thereby allowing said spring component to urge said sleeve member against said ring as aforesaid.

2. In the combination of claim 1, the further improvement wherein the pipe-engaging latch members comprise a plurality of balls disposed radially about the plug body, in combination with a gravity-operated member defining inclined surfaces adapted to displace said balls outwardly from the body.

References Cited by the Examiner
UNITED STATES PATENTS

| | | | |
|---|---|---|---|
| 491,184 | 2/93 | McCartney | 220—24.5 |
| 1,185,116 | 5/16 | Mack | 220—24.5 |
| 2,298,552 | 10/42 | Du Vall | 220—24.5 |
| 2,409,811 | 10/46 | Taylor et al. | 166—125 |
| 2,475,748 | 7/49 | Le Roy | 200—24.5 |
| 2,538,288 | 1/51 | Whitsel | 220—24.5 |
| 2,848,404 | 8/58 | Treshow | 204—193.39 |
| 2,851,410 | 9/58 | Vernon et al. | 204—154.39 |
| 2,893,693 | 7/59 | Clark | 166—136 X |

FOREIGN PATENTS

| | | |
|---|---|---|
| 550,839 | 6/58 | Italy. |
| 806,984 | 1/59 | Great Britain. |

CHARLES E. O'CONNELL, *Primary Examiner*.
R. L. CAMPBELL, L. D. ROSDAL, *Examiners*.